April 6, 1971   C. P. COVINO   3,574,071
FLUORINE-CONTAINING RESIN COATED ARTICLES
Filed March 29, 1968

INVENTOR.
Charles P. Covino
BY

ATTORNEY

United States Patent Office 3,574,071
Patented Apr. 6, 1971

3,574,071
FLUORINE-CONTAINING RESIN COATED ARTICLES
Charles P. Covino, Upper Montclair, N.J., assignor to General Magnaplate Corporation, Linden, N.J.
Continuation-in-part of applications Ser. No. 384,615, July 23, 1964, and Ser. No. 554,353, June 1, 1966. This application Mar. 29, 1968, Ser. No. 717,278
Int. Cl. C23b 9/02
U.S. Cl. 204—38
16 Claims

ABSTRACT OF THE DISCLOSURE

A process for preparing a composite aluminum article having an inner layer of aluminum, an intermediate integral layer of aluminum oxide, and an outer layer of a fluorine-containing resinous material comprising anodicly oxidizing a clean aluminum metal in an aqueous bath at a temperature between 25° F. and 80° F., said bath containing between 4% and 7.34% of sulfuric acid and between 0.5 and 3% of a carboxylic acid, while passing air through said aqueous bath to form an oxide coating on the aluminum metal. The oxide coated aluminum is then rinsed and immersed in a liquid aqueous impregnation bath containing fluorine-containing hydrocarbon polymer resin particles to form an outer resin coating at least about 0.0001 inch thick.

---

Figure 1:
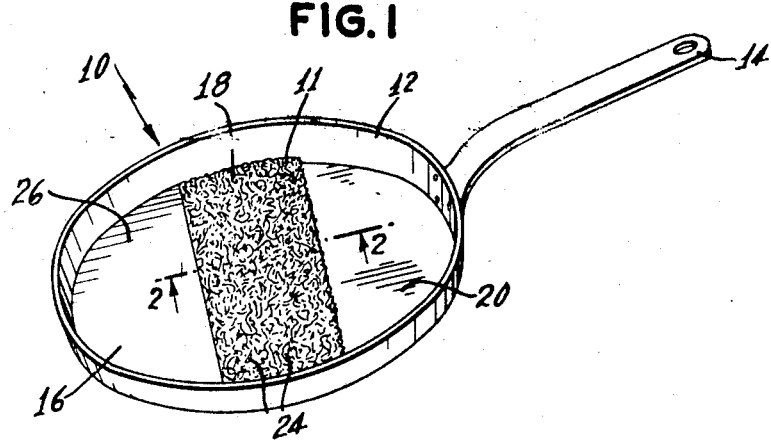

The invention also provides a process for resin coating an article having a roughened or porous surface wherein said article is heated until it is dry and at a temperature above about 140° F., and then immersing said heated article into a liquid aqueous impregnation bath at a temperature below about 90° F. The impregnation bath contains fluorine-containing hydrocarbon particles. The article is immersed in said bath until it is coated with said resin particles.

This application is a continuation-in-part application of my application Ser. No. 384,615 filed July 23, 1964, now abandoned and No. 554,353, filed June 1, 1966.

The present invention is directed to composite aluminum articles having a fluorinated hydrocarbon polymer surface and to processes for preparing said articles.

It is an object of the present invention to provide composite aluminum articles having a fluorinated hydrocarbon polymer surface. It is a further object of this invention to provide a composite aluminum cooking utensil having a fluorinated hydrocarbon polymer cooking surface. It is also an object of this invention to provide processes for preparing said composite articles. Other objects and advantages of the invention will be obvious and apparent from the disclosure herein.

In its broadest aspects, the invention contemplates providing composite metal articles having an inner base aluminum, an intermediate oxide layer integral with said base aluminum, and an outer fluorinated hydrocarbon polymer surface. The composite articles are prepared by treating aluminum surfaced articles to form integral oxide coatings on said aluminum surfaces. The oxide formed is an oxide of the base aluminum and is integral with the base aluminum. The oxide layer is irregular, coarsely crystalline, porous and highly absorptive. A finely subdivided fluorinated hydrocarbon polymeric material in a suitable vehicle is then applied to the oxide surface in an amount sufficient to be absorbed into and occupy the interstices and pores of the crystalline surface and also to provide a continuous polymer surface on top of the oxide layer.

The process of the invention is applicable to a wide range of available aluminum alloys, including wrought, cast and forged aluminum. The aluminum metal surface is first cleaned to remove dirt, smut, oxide coating, etc. by suitable methods including those used for preparing aluminum for anodizing. The cleaning treatment varies for different aluminum alloys. A suitable treatment for many aluminum alloys is immersion in a hot sodium hydroxide solution, e.g., containing about 5 to 6 ounces per gallon of sodium hydroxide, for up to one minute followed by one minute immersion in a chromic acid-nitric acid aqueous solution to remove surface smut. The part is then rinsed to remove the cleaning solution.

The irregular, coarsely crystalline, porous coating integral with the aluminum surface is grown upward and outward therefrom formed by anodic treatment of the aluminum in an oxidizing sulfuric acid bath utilizing relatively high voltages and high current densities, to obtain a highly absorptive oxide layer at least 0.0005 inch and preferably at least 0.001 inch. For special purposes, the oxide layer may be made thicker, e.g., 0.002 inch. When the desired oxide layer has been obtained, the article is removed from the acid tank, rinsed, and dipped into an aqueous solution containing finely subdivided fluorinated hydrocarbon polymeric material, and maintained in said solution until the interstices in the oxide layer absorb and are filled with the polymeric material and a top surface coating of at least about 0.0001 inch and preferably 0.0002 inch is formed. The oxide layer is formed extending outward from and on the surface of the basis metal and becomes bonded integral therewith by polymerized engagement with the irregular coarse crystalline surfaces.

The oxidizing sulfuric acid bath should contain between about 4% and 7.34% by volume of sulfuric acid (66° Baumé). The baths also preferably contain a carboxylic acid such as oxalic acid or equivalent acids, e.g., malonic acid, succinic acid, etc. in amounts between about 0.5% and 3%, and preferably about ⅕ the concentration of the sulfuric acid. A sugar, e.g., sucrose in small amounts may be also be included in the bath. Obviously, the sulfuric acid content of the bath may be supplied by acid of a strength other than the commonly available 66° Baumé acid.

During the formation of the oxide coating, the bath is highly agitated. It is also important that the bath contain relatively high concentrations of dissolved oxygen and preferably also dissolved carbon dioxide. This is accomplished by passing large quantities of air, preferably about 0.5 to 1 cubic foot per minute of air per gallon of solution, through the bath to provide the agitation and to supply the gases to the bath.

The bath is operated at temperatures between about 25° F. and 80° F. The preferred temperature varies somewhat for different aluminum alloys. Temperature below about 65° F., and preferably between 35° F. and 45° F. are preferred for treating most of the aluminum alloys in greatest commercial demand. The oxidation process usually requires at least about 18–20 minutes and may be as much as an hour and a half, dependent upon the alloy being treated, the current density and voltage utilized, the desired oxide thickness, etc. The voltage utilized varies from about 24 to about 130 volts. The amperage may vary from 10 amps/sq.ft. to about 150 amps/sq.ft., and is preferably about 25 amps/sq.ft. to 120 amps/sq.ft. The initial desired current density is obtained on the aluminum metal surface at relatively low voltages.

As the oxide coating is formed and grown or built up, the electric resistance increases markedly requiring substantially higher voltages to obtain the requisite current densities. Consequently, the voltage is periodically stepped up during most of the processing cycle. The use of stepped voltage and the high current density causes the growth of elongated alumina crystals. Upon removal from the oxide-forming bath, the article is rinsed in cold water until the acid remaining in the interstices of the crystals and pores is removed and/or neutralized. The article is then immersed in the fluorine-containing hydrocarbon polymer impregnation tank.

The impregnation tank contains an aqueous solution of the fluorine-containing hydrocarbon polymer. The concentration of the polymeric material in the solution may vary widely. As little as one pound of polymeric material in the solution may vary widely. As little as one pound of polymeric material per 100 pounds of water has been found to be operative. The preferred operating range is between about 10% and 35% by weight, with about one pound of the polymeric material to between 15 and 20 pounds of water (about 18%–24%) being particularly preferred. Higher concentrations, for example, up to a 1:1 weight ratio, are operative. However, at higher concentrations, processing difficulties are encountered attributable to the syrup-like characteristics of the bath. The polymeric material should be finely subdivided so that it will be absorbed by and packed by molecular attraction into the fine interstices and pores of the absorptive coarsely crystalline aluminum oxide. For this purpose, particles up to about 5 microns in size are used. It is preferred that the mean particle size be below about 2 microns and optionally below 1 micron. Useful results have been obtained with available dispersions having particles of .02 micron and less.

The polymer impregnation tank is operated at temperatures from freezing to the boiling temperature of the aqueous impregnation bath. When the bath is operated at high temperatures, the aluminum article is preferably wet when immersed in the bath. When using an impregnation bath having a temperature between 90° F. and 110° F., it is preferable to heat the aluminum article to a temperature between 140° F. and to 212° F., and preferably between 150° F. and 200° F. If the article is heated above 212° F., water may be vaporized when it is immersed into the tank.

It has been discovered that cold aqueous impregnation baths containing the fluorine-containing hydrocarbon polymers in the amounts specified herein are stable, long lasting, and of unusual utility for impregnating porous surfaces generally and oxidized aluminum surfaces in particular. These baths may be maintained at temperatures from freezing up to about 90° F., e.g. in the range of maximum viscosity short of freezing. The range of between about 40° F. and 80° F. has been found most useful. The maximum rate and amount of polymer coating formed during the impregnation was obtained when the oxidized aluminum articles treated were given a water rinse after removal from the oxidation bath and then dried, and heated to a temperature between 140° F. and 212° F. as aforesaid, before being dipped into the cold impregnation bath.

The requisite impregnation time is readily determined in operation. It varies dependent upon the thickness of deposit desired and the combination of process and bath conditions utilized. A thickness of about 0.0002 inch thick is obtained by immersing a wet oxidized aluminum article for at ambient temperature into an immersion bath at a temperature above about 140° F. for about five minutes. Similar and sometimes superior results are obtained when immersing a dry hot oxidized aluminum article for only a few minutes into a cold impregnation bath.

The immersion time utilized is that required to obtain the desired thickness, e.g., about 0.0002 inch, at the conditions specified.

The materials referred to as "fluorinated" and utilized in the present invention, are fluorine-containing hydrocarbon homopolymers and co-polymers. These include tetrafluoropolyethylene, tetrafluoropolyethylene - hexa-fluoropolypropylene co-polymer, etc. The fluorinated polyethylene sold under the trademark Teflon is preferred.

The fluorinated hydrocarbon surfaced article is dried after removal from the impregnation tank, preferably air dried at temperatures above about 120° F. A preferred treatment for cooking material surfaces consists of air drying followed by baking in an oven at temperatures between about 350° up to about 750° F. Such treatment results in formation of a dry, tough film. Treatment at about 750° F. improves the film by a "sintering" effect.

Additional thicknesses of the fluorinated hydrocarbon surface may be built up by spraying the fluorinated hydrocarbon polymer in a suitable vehicle onto the air dried coating prepared in the aqueous impregnation tank. The vehicle may be a fluid organic material in which the resin is dispersed and/or dissolved. The vehicle is preferably volatile. Aqueous dispersions are preferred. The particles utilized may be of the same order of subdivision utilized in the impregnation tank or they may be larger particles. The spraying operation may build up surface thicknesses of several mils. After the build up of the surface by spraying to the desired thickness, the article is preferably dried and heated in an oven at between 350° F. to 750° F. as aforesaid.

The invention is further illustrated in the following example.

An aluminum plate (6061TG), 12″ x 12″ x ⅛″ thick, having a stop-off coating on one surface, was cleaned by immersion in a mild caustic solution at 150° F. for between 1½ to 1 minute. It was then rinsed and immersed in an aqueous nitric acid-chromic acid solution at room temperature for about ½ to 1 minute to remove the surface smut. The article was then rinsed. An oxide layer was applied or formed by making the article anodic in a tank containing 18 oz. per gallon of sulfuric acid, 3.5 oz. per gallon of oxalic acid and a small amount of sugar. The bath was maintained at 30° F. The solution was agitated by passage of about 1 cubic foot per minute of air per 10 gallons of solution in the tank. The initial voltage was 18 volts, and the initial amperage was 28 amps. (equivalent to about 25 amps. per sq. foot). The current density was maintained at about this level throughout the oxidizing treatment by raising the applied voltage in about 1 to 2 volt steps every 2 minutes. The oxidizing process was terminated after 45 minutes. An oxide layer about 0.001 inch thick had been formed.

The article was then rinsed with air agitated cold water for 15 minutes and dipped into an impregnation tank containing one pound of tetrafluoropolyethylene per 24 pounds of water. The fluorinated polyethylene was dispersed in particles of about 0.2 micron. The impregnation tank was at a temperature of 160° F. At the end of 30 minutes, the article was withdrawn from the impregnation tank, air dried and then placed in an oven and baked in 400° F. for 15 minutes. The resultant article had a tetrafluoropolyethylene surface about 0.0003 inch thick. The surface was sound, slippery, and had superior properties.

Another sample of aluminum plate having its surface oxidized as aforesaid was rinsed in cold water and then warm water after removal from the oxidizing bath. It was then heated until dry and to a temperature of about 180° F. and dipped into an aqueous impregnation bath containing about 20% by weight of polytetrafluoroethylene maintained at a temperature between 60° F. and 65° F. The bath was saturated with a nonionic surface active agent. The polytetrafluoroethylene mean particle size was about 0.2 micron. The immersion time was between about 2 and 5 minutes. Immersion was immediately followed by drying at a temperature of about 120° F. The resultant article had a sound slippery polytetrafluoroethylene surface. The resin appeared to have impregnated the porous oxide more completely than indicated in the procedure using the high temperature hot impregnation bath described hereinbefore.

Figure 2:
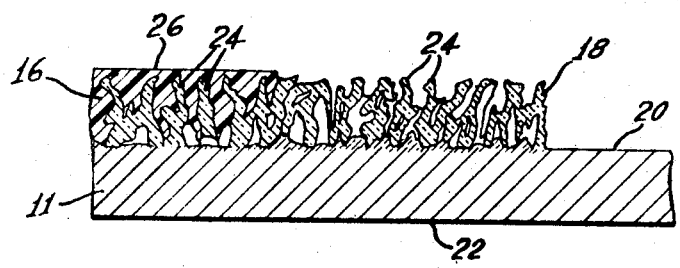

The present invention may be applied to a specific article of use such as a frying pan generally identified by the numeral 10 in FIG. 1. FIG. 1 is a perspective view of the frying pan 10 with portions of the cooking surface thereof illustrating stages of treatment of the base metal of such frying pan. FIG. 2 is a cross-section of FIG. 1 as taken along lines 2—2 to enable a clearer illustration of the cross-sectional appearance of the article 10 to which the invention has been applied.

Referring now to the drawing, the frying pan 10 there-shown is of conventional construction. It has a body 11 that is turned upward about its periphery to form a retaining rim 12. A handle 14 is connected to the rim 12 in the usual manner so that the frying pan 10 may be easily manipulated. To enable an understanding of the invention, the cooking surface of the frying pan 10 has been divided into three sections 16, 18 and 20. FIG. 2 is a cross-section partially showing the details of the three treated surfaces 16, 18 and 20.

The surface 20 illustrates the base metal 11 of the frying pan 10 in its untreated condition. The surface 18 illustrates an intermediate stage of treatment of the base metal 11 whereby the intermediate layer 18 is formed as an absorptive, irregularly shaped, coarsely crystalline, porous oxide growth of the base metal. The portion 16 of the frying pan 10 shows the final treatment by a fluorinated resin in accordance with the invention.

The frying pan 10 was prepared by taking a conventional aluminum frying pan having the structural details above described. The undersurface 22 of the frying pan was protected with a stop-off composition so as to prevent its treatment in accordance with the invention. The interior portions 16 and 18 of the pan were treated in accordance with the steps of the invention. The portion 20 also had a stop-off composition applied to it to prevent its treatment. The portion 18 was treated by cleaning and forming the intermediate oxide layer thereon in accordance with the processes of the previously described example relating to the treatment of aluminum. This resulted in the production of a coarsely crystalline aluminum oxide layer or surface 18 in which the crystals are identified by the numeral 24. This layer or surface was about 0.001" thick. When treated according to the invention, the pores formed between the crystals 24 appear to have absorptive properties that tend to rapidly soak up, like a sponge, liquids with which the same may come into contact. Thus, the portion 18 of the frying pan 10 illustrates the appearance of the intermediate layer that has been grown directly from the base metal, formed as an integral part thereof, and extends upward therefrom such that when any liquid material comes in contact with the same, the liquid is rapidly absorbed by the intermediate layer.

That portion of the pan 16 illustrated in the figures of the drawing was then treated by the resin impregnation steps of the foregoing examples relating to the treatment of aluminum. As the resin 26 and the intermediate layer came into contact with each other, the resin was quickly absorbed in the pores formed between the crystals 24 of such layer. When the resin 26 polymerized, the result was the composite article shown at the portion 16 wherein the resinous material 26 is polymerized and bonded directly to the surfaces of the irregularly shaped coarse crystals 24 of the layer 18, filling the interstices thereof and depositing an outer covering over both the intermediate layer 18 and the base metal 11. In this way, the resinous material 26 became an integral bonded part of the intermediate layer 18 which itself was a direct growth and formation of the base metal and, therefore, inseparable from such base metal. In consequence, the resultant structure became a unitary or composite article from which neither the base metal 11, the intermediate layer 18 nor the resinous material 26 could be separated from each other. Scratch tests with sharp metal objects performed on the portion 16 of the frying pan 10 failed to lift, or tear away, or separate the resinous material 26 from either the intermediate applied layer 18 or the base metal 11.

The process of the present invention is readily applied simultaneously to both surfaces of flat or dished aluminum articles, e.g., pots and frying pans. The composite article would have an inner cooking resin surface bonded to the oxide layer which is integral with the aluminum. The other (outer) surface of the aluminum is also coated with an integral oxide layer which is covered with an outer resin surface. Such composite articles are excellent cooking utensils.

The composite articles of the present invention have extremely adherent, tough and useful resin polymer surfaces. These articles show great resistance to corrosion. They have a very low coefficient of surface friction resulting in a high degree of lubricity. They have the unusual combination of a highly corrosion resistant, slippery and abrasion resistant organic plastic surface, coupled with good surface hardness. It has unusually high heat transfer characteristics. It has excellent electrical resistance and resistance to radiation-caused degradation. Because of the process utilized in the preparation of these composite aluminum articles, it is possible to manufacture them with excellent surface finishes to close tolerances.

As many embodiments of this invention may be made without departing from the spirit and scope thereof, it is to be understood that the invention includes all such modifications and variations as come within the scope of the appended claims.

What is claimed is:

1. The process for preparing a composite aluminum article having an inner layer of aluminum, an intermediate layer of aluminum oxide, and an outer layer of a fluorine-containing resinous material comprising
    (i) cleaning the surface of said aluminum metal;
    (ii) forming an aluminum oxide coating integral with and on said aluminum metal by making said cleaned aluminum anodic in an aqueous bath at a temperature between 25° F. and 80° F. and containing between about 4% and 7.34% by volume of sulfuric acid, and between about 0.5 and 3% by volume of a carboxylic acid, through which air is passed to provide oxygen and carbon dioxide to the solution; by impressing a voltage of between 24 and 130 volts and sufficient to apply an anodic current density from about 10 amperes per square foot to 120 amperes per square foot, until a coating at least about 0.0005 inch is obtained, and then rinsing said article, and then
    (iii) immersing said oxide coated aluminum which is at a temperature between about 150° F. and about 212° F. in a liquid aqueous impregnation bath at a temperature between about 40° F. and about 80° F. and containing fluorine-containing hydrocarbon polymer particles having a mean particle size of up to about 5 microns until said polymer particles pack in the interstices and pores of the oxide layer and form an outer coating at least about 0.0001 inch thick.

2. The process of claim 1, wherein said aluminum article is rinsed after it is removed from the sulfuric acid-containing bath, and is then dried and heated to a temperature between about 150° F. and about 212° F. and then immersed into said liquid aqueous impregnation bath which is at a temperature between about 40° F. and about 80° F.

3. The process of claim 1 wherein said aqueous bath in which said aluminum is oxidized contains at least 1 carboxylic acid selected from the group consisting of malonic acid, oxalic acid, and succinic acid, in an amount about ⅕ of the amount of sulfuric acid; wherein said bath is at a temperature between about 35° F. and 65° F.; wherein at least about 0.5 cubic foot of air per minute per gallon of solution is passed through said solution;

wherein said anodic current density is at least about 25 amperes per square foot; and wherein said impregnation bath contains about 10% and 35% by weight of polymer particles having a mean particle size of up to about 2 microns.

4. The process of claim 3 wherein said carboxylic acid is oxalic acid; and wherein the temperature of said aqueous bath containing said oxalic acid is between about 35° and 45° F.

5. The process of claim 4 wherein said sulfuric acid bath contains between about 6% and 7.34% of sulfuric acid; wherein said voltage is impressed until an oxide coating at least about 0.001 inch thick is obtained; wherein said impregnation bath contains between about 18% and 24% of polytetrafluoroethylene particles having a mean particle size of up to about 1 micron, and wherein the polytetrafluoroethylene coated aluminum article is dried and heated to a temperature of at least about 350° F. after it has been removed from the liquid impregnation bath.

6. The process of claim 4 wherein said sulfuric acid bath contains between about 4% and 6% of sulfuric acid; wherein said voltage is impressed until a coating at least about 0.001 inch thick is obtained; wherein said impregnation bath contains between about 18% and 24% of polytetrafluoroethylene particles having a mean particle size of up to about 1 micron; and wherein the polytetrafluoroethylene coated aluminum article is dried and heated to a temperature of at least about 350° F. after it has been removed from the liquid impregnation bath.

7. The process of claim 4 wherein said sulfuric acid bath contains between about 6% and 7.34% of sulfuric acid; wherein said voltage is impressed until an oxide coating at least about 0.001 inch thick is obtained; wherein said impregnation bath contains between about 18% and 24% of polytetrafluoroethylene-polyhexafluoropropylene copolymer particles having a mean particle size of up to about 1 micron; and wherein said resin coated aluminum article is dried and heated to a temperature of at least about 350° F. after it has been removed from the liquid impregnation bath.

8. The process of claim 4 wherein said sulfuric acid bath contains between about 4% and 6% of sulfuric acid; wherein said voltage is impressed until an oxide coating at least about 0.001 inch thick is obtained; wherein said impregnation bath contains between about 18% and 24% of polytetrafluoroethylene-polyhexafluoropropylene copolymer particles having a mean particle size of up to about 1 micron; and wherein said resin coated aluminum article is dried and heated to a temperature of at least about 350° F. after it has been removed from the liquid impregnation bath.

9. The process of claim 4, wherein said aluminum article is rinsed after it is removed from the sulfuric acid-containing bath, and is then dried and heated to a temperature between about 150° F. and abou 212° F. and then immersed into said liquid aqueous impregnation bath which is at a temperature between about 40° F. and about 80° F.

10. The process of claim 4 wherein said impregnation bath contains polytetrafluoroethylene particles of a particle size up to about 1 micron; and wherein the polytetrafluoroethylene coated aluminum article is dried and heated to a temperature of about 350° F. after removal from the said impregnation bath.

11. The process of claim 10, wherein said aluminum article is rinsed after it is removed from the sulfuric acid-containing bath, and is then dried and heated to a temperature between about 150° F. and about 200° F. and then immersed into said liquid aqueous impregnation bath which is at a temperature between about 40° F. and about 80° F.

12. A process for resin coating an aluminum article having a roughened or porous surface comprising heating said article until it is dry and at a temperature between about 150° F. and about 212° F., and immersing said dry heated article into a liquid aqueous impregnation bath which is at a temperature between about 40° F. and about 80° F. and contains fluorine-containing hydrocarbon resin particles having a mean particle size of up to about 5 microns, until a resin coating on said article at least about 0.0001 inch thick is formed.

13. The process of claim 12 for resin coating an aluminum article having a porous surface comprising heating said article until it is dry and at a temperature between about 150° F. and 212° F., and then immersing said heated metal article into a liquid aqueous impregnation bath which is at a temperature between about 40° F. and 80° F., until a resin coating on said article at least about 0.0001 inch thick is formed; and wherein said resin particles have a mean particle size of up to about 5 microns.

14. The process of claim 13, wherein said metal article is an anodized aluminum article which is heated to a temperature between about 150° F. and 200° F. before it is immersed into the impregnation bath.

15. The process of claim 14, wherein said resin particles are of a mean particle size up to about 2 microns.

16. The process of claim 15, wherein said impregnation bath is maintained at a temperature in the range of maximum viscosity short of freezing.

References Cited

UNITED STATES PATENTS

| 2,107,318 | 2/1938 | Work et al. | 204—58X |
| 2,537,433 | 1/1951 | Waring | 126—19 |
| 2,125,387 | 8/1938 | Mason | 91—70 |
| 2,542,069 | 2/1951 | Young | 260—33.4 |
| 2,552,285 | 5/1951 | Knewstubb et al. | 154—129 |
| 2,647,079 | 7/1953 | Burnham | 204—38 |
| 2,760,925 | 8/1956 | Bryant | 204—38 |
| 2,745,898 | 5/1956 | Hurd | 174—120 |
| 2,802,897 | 8/1957 | Hurd et al. | 174—110 |
| 2,920,018 | 1/1960 | Miller | 204—56 |
| 3,279,936 | 10/1966 | Forestek | 117—2 |

FOREIGN PATENTS

| 548,862 | 10/1942 | Great Britain | 204—58 |
| 654,299 | 12/1962 | Canada | 204—58 |

OTHER REFERENCES

Wernick et al.: The Surface Treatment and Finishing of Aluminum and Its Alloys, third edition (1964) pp. 478–482.

JOHN H. MACK, Primary Examiner

R. J. FAY, Assistant Examiner

U.S. Cl. X.R.

204—58